(12) United States Patent
Koma et al.

(10) Patent No.: US 6,246,458 B1
(45) Date of Patent: Jun. 12, 2001

(54) METHOD FOR MANUFACTURING LIQUID CRYSTAL DISPLAY

(75) Inventors: Norio Koma; Kiyoshi Yoneda; Tetsuji Omura, all of Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/193,748

(22) Filed: Nov. 17, 1998

(30) Foreign Application Priority Data

Nov. 18, 1997 (JP) .................................................... 9-317170

(51) Int. Cl.⁷ .................................................... G02F 1/1337
(52) U.S. Cl. .............................................. 349/124; 349/130
(58) Field of Search ..................................... 349/124, 130

(56) References Cited

U.S. PATENT DOCUMENTS

| | | | |
|---|---|---|---|
| 4,472,027 | * 9/1984 | Okubo et al. ........................ | 349/130 |
| 5,051,570 | 9/1991 | Tsujikawa et al. . | |
| 5,084,905 | 1/1992 | Sasaki et al. . | |
| 5,307,189 | 4/1994 | Nishiki et al. . | |
| 5,309,264 | 5/1994 | Lien et al. . | |
| 5,477,359 | * 12/1995 | Okazaki ............................... | 349/130 |
| 5,585,951 | 12/1996 | Noda et al. . | |
| 5,612,799 | 3/1997 | Yamazaki et al. . | |
| 5,618,592 | 4/1997 | Nagae et al. . | |
| 5,629,786 | 5/1997 | Ogura et al. . | |
| 5,666,179 | 9/1997 | Koma . | |
| 5,680,189 | * 10/1997 | Shimizu et al. ...................... | 349/130 |
| 5,706,064 | 1/1998 | Fukunaga et al. . | |
| 5,708,485 | 1/1998 | Sato et al. . | |
| 5,719,647 | 2/1998 | Fujikawa et al. . | |
| 5,726,721 | 3/1998 | Sumiyoshi et al. . | |
| 5,757,455 | 5/1998 | Sugiyama et al. . | |
| 5,760,861 | 6/1998 | Kim . | |
| 5,767,827 | 6/1998 | Kobayashi et al. . | |
| 5,784,132 | 7/1998 | Hashimoto . | |
| 5,831,704 | 11/1998 | Yamada et al. . | |
| 5,844,538 | 12/1998 | Shiraki et al. . | |
| 5,870,157 | 2/1999 | Shimada et al. . | |
| 5,877,832 | 3/1999 | Shimada . | |
| 5,956,105 | 9/1999 | Yamazaki et al. . | |
| 5,990,491 | 11/1999 | Zhang . | |

FOREIGN PATENT DOCUMENTS

| | | | |
|---|---|---|---|
| 61-141174 | 6/1986 | (JP) | ............................. H01L/27/14 |
| 1156725 | 6/1989 | (JP) | ............................. G02F/1/133 |
| 2234134 | 9/1990 | (JP) | ............................. G02F/1/136 |
| 8-122768 | 5/1996 | (JP) . | |

* cited by examiner

Primary Examiner—James A. Dudek
(74) Attorney, Agent, or Firm—Hogan & Hartson, LLP

(57) ABSTRACT

On a substrate, a gate electrode, a gate insulating film covering the gate electrode, a p-Si film, and an interlayer insulating film covering the p-Si film are formed. On these a drain electrode and a source electrode are formed, so as to form a thin film transistor. In addition, a smoothing insulator film covering the thin film transistor, a pixel electrode, and a vertical alignment film covering the pixel electrode are formed. The vertical alignment film is not processed with rubbing treatment, so that the liquid crystal having negative dielectric constant anisotropy is controlled in an initial direction of the substantially normal direction without pretilt. Upon applying a voltage, the tilt of the orientation is controlled in the direction of a slanting electric field at the edge of the pixel electrode, so that a pixel division is performed. Since the rubbing treatment is not performed, electrostatic breakdown of the thin film transistor is prevented.

9 Claims, 14 Drawing Sheets

METHOD FOR MANUFACTURING LIQUID CRYSTAL DISPLAY

BACKGROUND OF THE INVENTION

1. Field of the Invention

The present invention relates to a method for manufacturing a liquid crystal display (LCD).

2. Description of the Related Art

Flat panel displays such as LCD, organic electroluminescence (EL), or plasma displays have been enthusiastically developed and commercialized in recent years. Particularly, LCDs has become a main display for office automation (OA) devices and audio visual (AV) devices because LCDs have attractive features such as thin and low power consumption. Especially, active matrix LCDs having thin film transistors (TFTs) as switching elements for controlling a timing to rewrite pixel data into each pixel enable a wide screen and animation display with a high resolution, and have become widely used in various television sets, personal computers, mobile computers, and monitors for digital still and video cameras.

A TFT is a kind of field effect transistor (FET) made of metal and semiconductor layers formed in a predetermined pattern on an insulated substrate. In an active matrix LCD, each TFT is connected to a corresponding capacitor for driving the liquid crystal disposed between a pair of substrates; the capacitor is constructed between the substrates.

FIG. 1 is an enlarged plan view of a display pixel portion of an LCD, and FIG. 2 is a cross section of the LCD along B—B line shown in FIG. 1. On the substrate 50 a gate electrode 51 is formed that is made of Cr, Ti, Ta, or another suitable metal, over which a gate insulating film 52 is formed. On the gate insulating film 52 an amorphous silicon, i.e., a-Si film 53 is formed in an island shape so as to cross over the gate electrode 51. On the a-Si film 53 an N$^+$ a-Si film 53N is formed, each end of which is doped with impurities so as to make an ohmic layer. Above the channel region of the a-Si film 53, an etch stopper 54 is remained. On the N$^+$ a-Si film 53N a drain electrode 56 and a source electrode 57 are formed, over which an interlayer insulating film 58 is formed. On the interlayer insulating film 58 a pixel electrode 59 that is made of indium tin oxide (ITO) or Al is formed, which is connected to the source electrode 57 via a contact hole formed in the interlayer insulating film 58. On the pixel electrode 59 an alignment film 71 made of polyimide or the like is formed, and is processed by rubbing treatment as shown in FIG. 3. In this way, the TFT substrate is manufactured.

On another substrate 60 facing the TFT substrate 50, red (R), green (G), and blue (B) color filters 61 are formed, each of which is made of a film resist and is disposed at a position corresponding to each pixel electrode 59. In addition, a black matrix 61BM which is made of a light shielding film resist is formed at a position corresponding to a gap between the pixel electrodes 59 and at a position corresponding to the TFT. On the layers of these color filters 61 and the black matrix 61BM, a common electrode 62 made of ITO is formed. On the common electrode 62 an alignment film 72 is formed and is processed by rubbing treatment in the same way as on the substrate 50. In this way, the opposing substrate is manufactured.

Between the TFT substrate 50 and the opposing substrate 60, a liquid crystal layer 80 is disposed. The orientation, i.e., the alignment of the liquid crystal molecules 81 is controlled in accordance with an intensity of an electric field formed by a voltage applied between the pixel electrodes 59 and the common electrode 62. Outsides of the substrates 50 and 60 polarizing films (not shown) with perpendicular polarizing axes are provided. Linear polarized light passing through these polarizing films is modulated when passing through the liquid crystal layer 80 that is controlled in different alignments per each display pixel, and is thereby controlled in a desired transmittance.

FIGS. 4A–4E show a method for manufacturing the opposing substrate. First, in the step shown in FIG. 4A, the R, G and B color filters 61R, 61G and 61B are formed on the substrate 60. In order to form the R color filter 61R, an R film resist is affixed, which is then exposed and developed in the shape corresponding to the R display pixels. The G color filter 61G and the B color filter 61B are formed in a similar manner. These color filters 61R, 61G, and 61B are formed in dimensions slightly smaller than those of the corresponding display pixels 59 shown in FIG. 2.

In the next step shown in FIG. 4B, a light shielding film resist 61BM' is affixed, and is followed by the step shown in FIG. 4C, in which the film resist is exposed and developed in the shape corresponding to the gap between the pixels so that the black matrix 61BM is formed among the color filters 61R, 61G and 61B. This black matrix 61BM is formed in a dimension larger than the gap between the pixel electrodes 59 shown in FIG. 2.

In the next step shown in FIG. 4D, the ITO film is formed so as to produce the common electrode 62. In addition, in the step shown in FIG. 4E, a polyimide film is formed by a printing method. Then, the polyimide film is dried by baking, and processed by rubbing treatment. The film is rubbed in the arrow direction with a cloth so as to make the alignment film 72 for giving the pretilt to the liquid crystal.

In the above-mentioned example, the liquid crystal has a negative dielectric constant anisotropy. The alignment films 71 and 72 are vertical alignment films that control the initial alignment of the liquid crystal in the direction perpendicular to the substrate. In this case, when a voltage is not applied, the linear polarized light that passed through one of the polarizing films is blocked by the other polarizing films after passing through the liquid crystal layer 80 so that the display is recognized as black. When the voltage is applied, the linear polarized light that passed through one of the polarizing films is double refracted by the liquid crystal layer 80 to become an elliptically polarized light, which passes the other polarizing films so that the display is recognized as nearly white. This type is called a normally black (NB) mode. Particularly, the vertical alignment films 71 and 72 are processed by the rubbing treatment, so that the initial directions of the liquid crystal molecules 81 are aligned in the direction with a slight pretilt from the normal direction. This pretilt angle θ is normally set to more than one degree, but equal to or less than five degrees. The liquid crystal molecule 81 is electrically uniaxial. The angle between the axial direction and the direction of the electric field is determined by the electric field strength, while the azimuth with respect to the direction of the electric field is not controlled. The liquid crystal molecule 81 having the negative dielectric constant anisotropy tilts in a direction different from the electric field direction. However, by providing pretilt, an applied voltage can make the liquid crystal molecule 81 tilt toward the pretilt direction. Therefore, the tilt directions are aligned so that a variation of alignments of the liquid crystal in a plane can be suppressed and deterioration of the display quality can be prevented.

The black matrix 61BM is provided for preventing a drop of the contrast ratio due to undesired light that is emitted from the display by the birefringence of the liquid crystal with the pretilt and passes through the liquid crystal layer 80 in a region in which the voltage is not applied between the display pixels.

The liquid crystal having a negative dielectric constant anisotropy changes the alignment of its molecules upon the electric field in such a way that the alignment becomes perpendicular to the direction of the electric field. On this occasion, the liquid crystal generates an action opposing the generated electric field. Generally, however, such a change of the orientation from the vertical alignment of the liquid crystal is not stable compared with a liquid crystal having a positive dielectric constant anisotropy such as a twist nematic (TN) liquid crystal changes from the horizontal alignment. Especially, unevenness of the alignment film 71 and 72 at the interface with the liquid crystal layer 80 due to a step of the TFT or the color filter influences the alignment change of the liquid crystal molecules 81, resulting in a deteriorated display quality.

Furthermore, as shown in FIGS. 3 and 4E, the related art uses a rubbing treatment for the vertical alignment film 71 and 72 in order to give the pretilt θ to the initial direction of the liquid crystal as shown in FIG. 2. Therefore, when the voltage is applied, all the liquid crystal molecules 81 tilt in the direction of the pretilt (rightward in FIG. 2). Accordingly, the tilt angle of the liquid crystal molecule 81 with respect to the optical path when viewing the LCD from upper right in FIG. 2 is different from that when viewing the LCD from upper left, resulting different transmittances. Thus, there is a problem that a brightness or a contrast ratio changes in accordance with a viewing direction. This is called viewing angle dependence.

Furthermore, since the black matrix 61BM formed on the opposing substrate 60 side should cover the gap region between the pixel electrodes completely, it is formed larger in consideration of position shift when the black matrix 61BM is affixed to the TFT substrate 50 side. For this reason, effective display area decreases and aperture ratio decreases.

In addition, rubbing treatment for making the vertical alignment film 71 of the TFT substrate side may cause an electrostatic breakdown of the TFT, which results in defective display or decline of yield in production of LCDs. Furthermore, rubbing process includes not only rubbing treatment itself but also cleaning treatment after the rubbing treatment. The rubbing process cause the cost of display higher.

SUMMARY OF THE INVENTION

The present invention relates to a method for manufacturing a liquid crystal display that has first and second substrates facing each other, the outer surface of the first and/or second substrate being provided with a polarizing film, and the liquid crystal disposed between the first and second substrates for modulating light that passed through the polarizing film so as to perform display. The method according to the present invention comprising the steps of:

forming a plurality of thin film transistors and electrode wires thereof on the surface of the first substrate facing the second substrate;

forming an insulating film having a planarization surface for covering the thin film transistors and the electrode wires thereof;

forming an opening in the insulating film so as to expose a part of the corresponding thin film transistor;

forming a pixel electrode for driving the liquid crystal on the insulating film and connecting the pixel electrode to the thin film transistor via the opening;

forming a first film to be a vertical alignment film covering the pixel electrodes, for controlling an initial direction of the liquid crystal;

heating and drying the first film to make the vertical alignment film that controls the initial direction of the liquid crystal in the direction within one degree from the normal direction of the substrates;

forming a common electrode for driving the liquid crystal on the surface of the second substrate facing the first substrate, and forming a direction control window that is no electrode portion having a predetermined shape in the area of the common electrode facing the pixel electrode;

forming a second film to be a vertical alignment film covering the common electrode, for controlling an initial direction of the liquid crystal;

heating the second film to make the vertical alignment film that controls the initial direction of the liquid crystal in the direction within one degree from the normal direction of the substrates;

affixing the first substrate to the second substrates with a predetermined gap;

injecting the liquid crystal having negative dielectric constant anisotropy into the gap between the first and second substrates, followed by sealing the gap; and affixing a polarizing film onto the outer surface of the first and/or second substrate.

According to another aspect of the present invention, the method comprising the steps of:

forming a gate electrode of a thin film transistor and a wire thereof on the surface of the first substrate facing the second substrate;

forming a gate insulating film that covers the gate electrode;

forming an amorphous semiconductor layer on the gate insulating film;

performing laser annealing process to the amorphous semiconductor layer to make polycrystal for forming a polycrystal semiconductor layer;

doping an impurity into a predetermined region of the polycrystal semiconductor layer at a predetermined concentration;

patterning the polycrystal semiconductor layer into areas necessary for the thin film transistor;

forming a first interlayer insulating film on the polycrystal semiconductor layer, and removing a portion above the region that was doped with the impurity so as to form a first opening;

forming a drain and/or source electrode and a wire thereof on the first interlayer insulating film, and connecting the drain and/or source electrode to the regions doped with impurity, respectively, via the first opening;

forming a second interlayer insulating film covering the thin film transistor and having a planarization surface, and removing a predetermined portion above the thin film transistor so as to form a second opening;

forming a pixel electrode for driving the liquid crystal, and connecting the pixel electrode to the thin film transistor via the second opening;

forming a first film to be a vertical alignment film covering the pixel electrodes, for controlling an initial direction of the liquid crystal;

heating and drying the first film to make a vertical alignment film for controlling an initial direction of the liquid crystal in the direction within one degree from the normal direction of the substrates;

forming a common electrode for driving the liquid crystal on the surface of the second substrate facing the first substrate, and forming a direction control window where no electrode is disposed having a predetermined shape in the area of the common electrode facing the pixel electrode;

forming a second film to be a vertical alignment film covering the common electrode, for controlling an initial direction of the liquid crystal;

heating and drying the second film to make a vertical alignment film for controlling an initial direction of the liquid crystal in the direction within one degree from the normal direction of the substrates;

affixing the first substrate to the second substrates with a predetermined gap;

injecting the liquid crystal into the gap between the first and second substrates, followed by sealing the gap; and affixing a polarizing film onto the outer surface of the first and/or second substrate.

Thus, because of the slanting electric field generated at the edge portion of the pixel electrode and in the region of the direction control window with no electric field, the tilt direction of the orientation of the liquid crystal can be controlled properly, and pixel division can be performed so that the viewing angle dependence is improved.

Preferably, the vertical alignment film is not processed by rubbing treatment.

Thus, the initial direction of the liquid crystal is controlled to be in the normal direction of the substrate, or to within one degree from the normal direction, so that the direction control of the liquid crystal by the electric field at the edge portion of the pixel electrode and in the direction control window is performed properly without any disturbance.

Preferably, the insulating film has thickness more than one micrometer.

Thus, the alignment control of the liquid crystal by the electric field at the edge portion of the pixel electrode and in the direction control window is not disturbed by the influence of the electric field of the thin film transistor and its electrode wire, so that the pixel division is performed properly.

As explained above, in the present invention, good pixel division is performed by controlling the electric field, the viewing angle dependence is reduced, and display quality is improved. In addition, since the rubbing treatment is not performed, production cost is reduced, electrostatic generation is prevented, and yield in production is improved. Furthermore, the aperture ratio is increased since a light shielding mask film is not needed. Furthermore, manufacturing cost is reduced because there is no rubbing process.

DESCRIPTION OF THE PREFERRED EMBODIMENT

FIGS. 8A–8I show a process for making the TFT substrate of the LCD in accordance with the embodiment of the present invention. First, in the step shown in FIG. 8A, a Cr film CR, Ti, Ta or the like is formed on a substrate 10 by sputtering, which is etched to form a gate electrode 11.

Figure 8A:
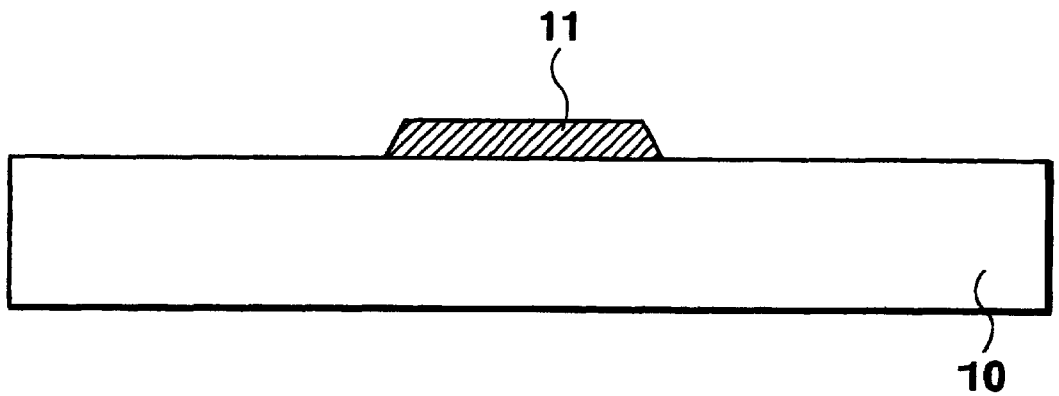
FIGS. 8A, 8B, 8C, 8D, 8E, 8F, 8G, 8H, and 8I are cross sections showing manufacturing steps of the TFT substrate of the liquid crystal display in accordance with the present invention.
Figure 8B:
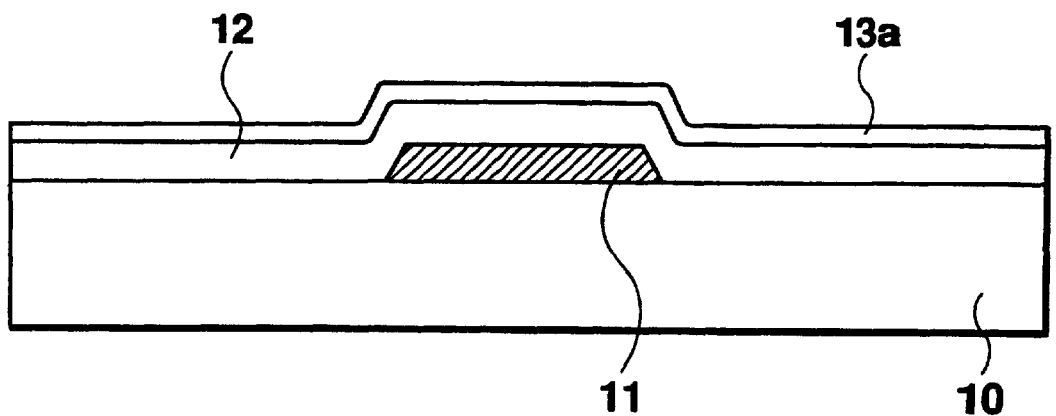

In the step shown in FIG. 8B, a gate insulating film 12 consisting of $SiN_x$ and $SiO_2$ is formed by the plasma CVD method so as to cover the entire surface including the gate electrode 11. Then, an amorphous silicon (a-Si) film 13a is formed in succession by the plasma CVD. The a-Si film 13a is formed by decomposing and depositing mono-silane $SiH_4$ or disilane $Si_2H_4$ that are material gasses with heat of approximately 400° C. and plasma.

Figure 8C:
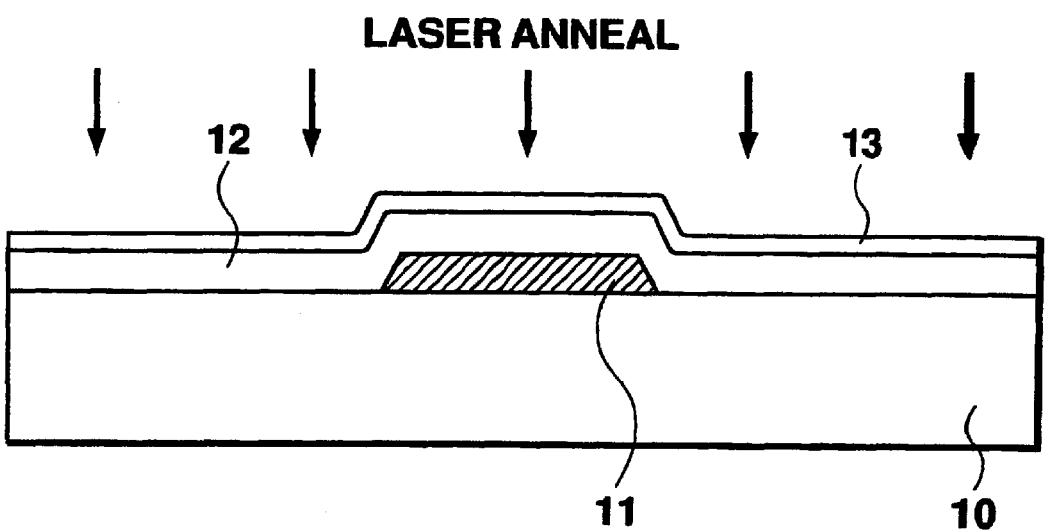

In the step shown in FIG. 8C, the a-Si film 13a is crystallized by laser annealing to form a p-Si film 13. The laser annealing is performed by line beam scanning of a pulse laser beam, for example. Since the laser annealing can be performed in relatively low temperature of the substrate below 600° C., a relatively cheap non-alkaline glass can be used for the substrate 10, so that low cost process can be attained.

Figure 8D:
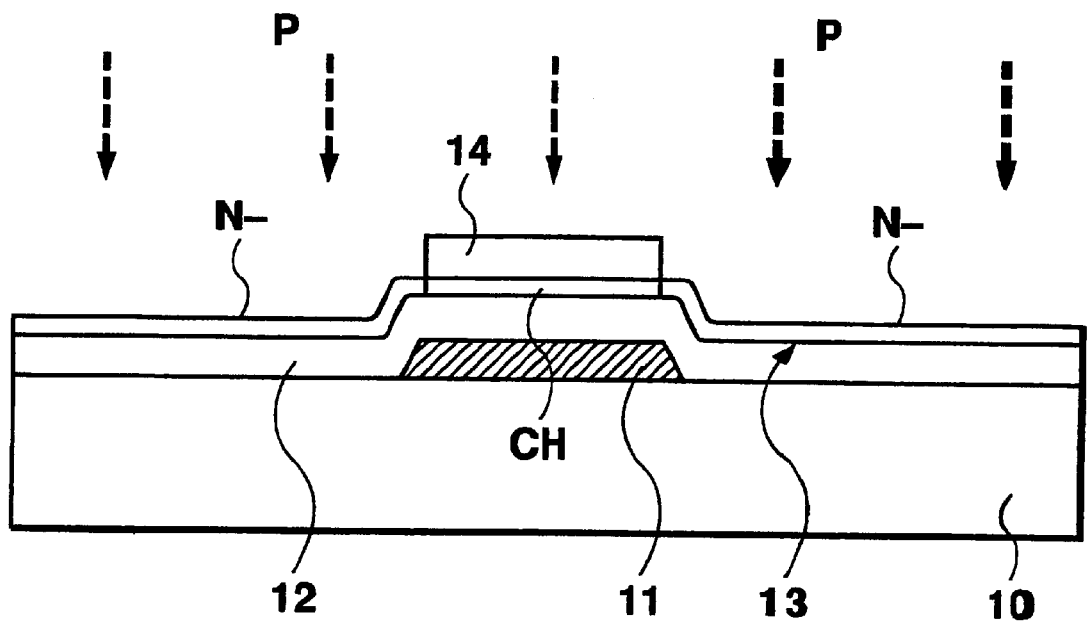

In the step shown in FIG. 8D, a $SiO_2$ film is formed on the p-Si film 13, and the $SiO_2$ film is etched by the back surface exposing so that a doping stopper 14 is formed above the gate electrode 11. In the back surface exposing step, a resist is applied onto the $SiO_2$ film, and the resist is exposed from beneath the substrate 10 utilizing the contour of the gate electrode 11, followed by developing. This doping stopper 14 is used as a mask for ion doping of phosphor (P) that indicates N-type conductivity into the p-Si film 13 at low dose extent of approximately $10^{13}$ so that the region except the doping stopper 14 forming region is doped at low concentration level ($N^-$). On this occasion, the region directly beneath the doping stopper 14, i.e., the region right above the gate electrode 11, is kept in an intrinsic semiconductor layer to be a channel region (CH) of the TFT. It is possible to leave the resist that was used for etching the doping stopper 14 during ion doping, and remove it after ion doping.

Figure 8E:
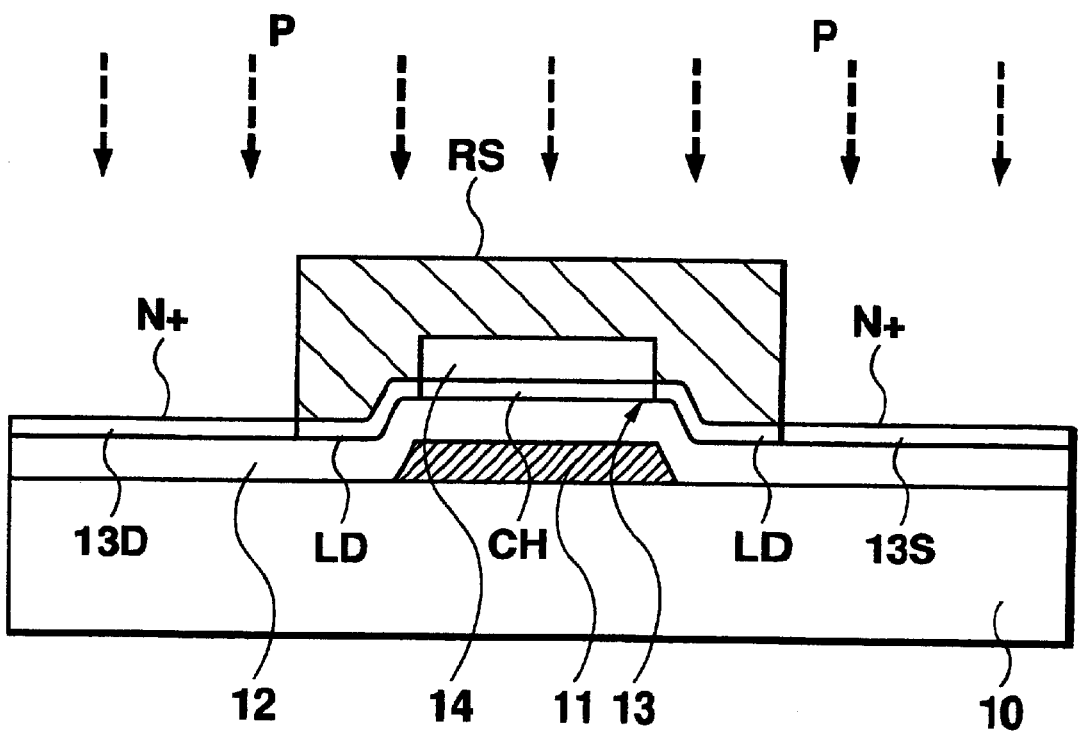

In the step shown in FIG. 8E, a resist RS that is larger than the gate electrode 11 at least in the channel length direction is formed and is used as a mask for ion doping of phosphor (P) into the p-Si film 13 at high dose extent of approximately $10^{15}$, so that the region, except for the resist RS, is doped at high concentration level ($N^+$). At this point, the low concentration region ($N^-$) and the channel region (CH) are kept in the region right below the resist RS. Thus, the LDD structure is obtained in which source and drain regions 13S and 13D are disposed at both sides of the channel region CH via the low concentration LD region.

After removing the resist RS, the p-Si film doped with the impurity ion is processed by activation annealing such as heating or laser irradiation in order to recover the crystalline of the p-Si film and to substitute the impurity for the lattice.

Figure 8F:
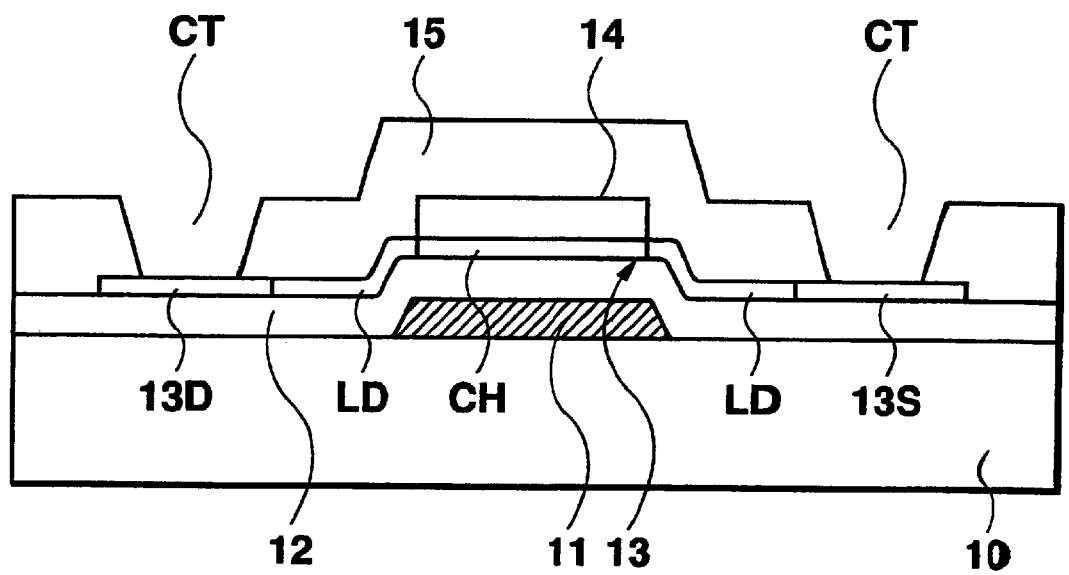

In the step shown in FIG. 8F, the p-Si film 13 is etched so as to form an island of necessary region for the TFT. Then, an interlayer insulating layer 15 is formed using $SiN_x$ and so on, in which the portions corresponding to the source and drain regions 13S and 13D are removed by etching so as to form contact holes CT, partially exposing the p-Si film 13.

Figure 8G:
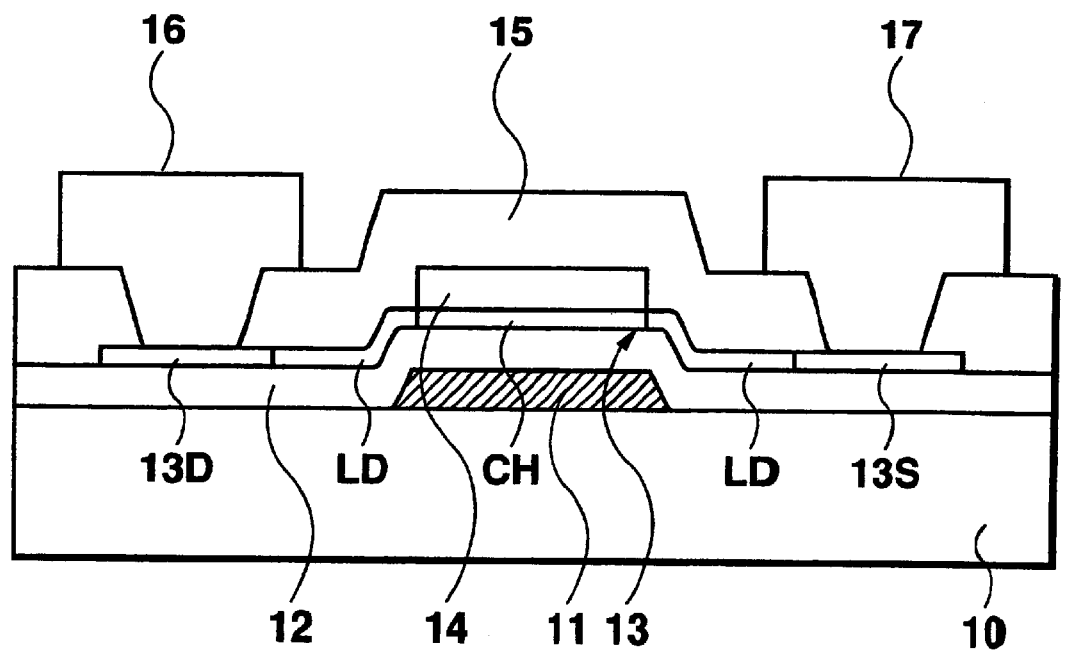

In the step shown in FIG. 8G, an Al/Mo film is formed by sputtering, which is etched to form a source electrode 17 connected to the source region 13S via the contact hole CT and a drain electrode 16 connected to the drain region 13D via the contact hole CT. The TFT is then complete.

Figure 8H:
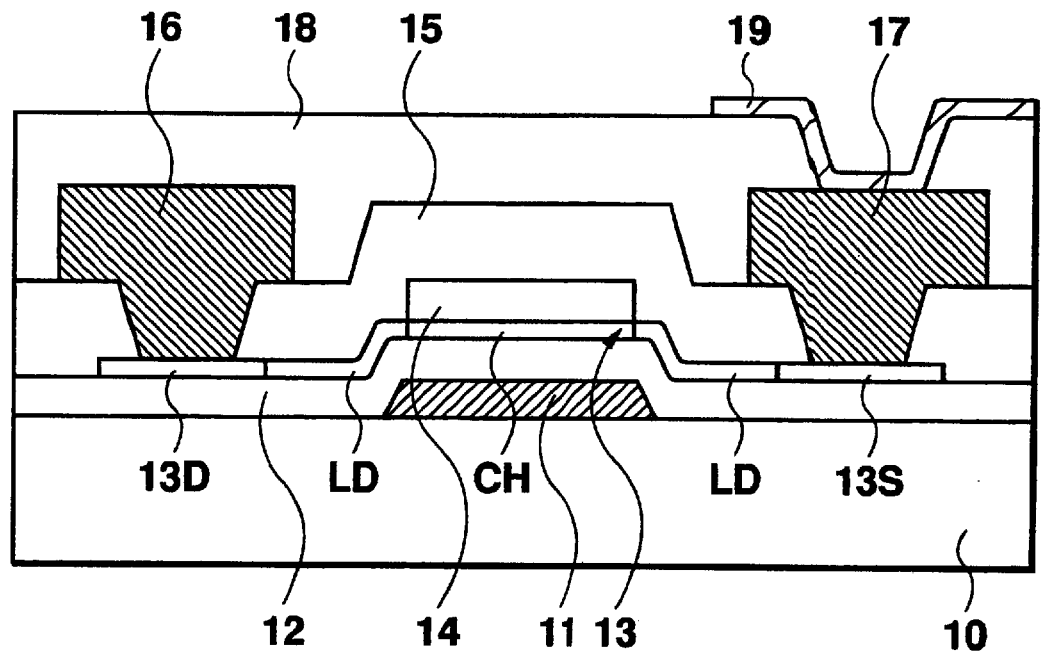

Furthermore, in the step shown in FIG. 8H, the planarization insulator film 18 having thickness of 1 μm made of photosensitive acrylic resin covering the TFT is formed. The planarization insulator film 18 is exposed and is developed so as to form contact holes in the display portions and to form naked upper portion of the source electrode 17. An ITO or Al film is then formed by sputtering, which is etched to form the pixel electrode 19 that is connected to the source electrode 17. The planarization insulator film 18 can be of SOG or BPSG. In these cases, contact holes can be formed by etching.

Figure 8I:
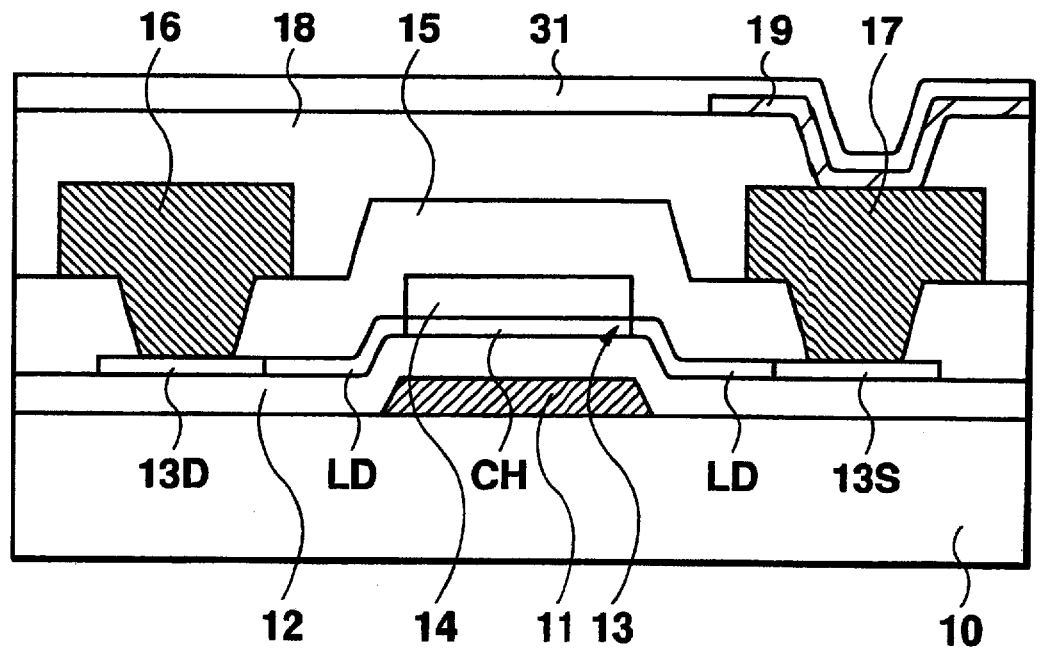

In the step shown in FIG. 8I, a liquid-like polyimide is coated by printing and is prebaked at 80° C. for 10 minutes, followed by main baking at 180° C. for 30 minutes and drying so as to form the vertical alignment film 31.

As mentioned above, the TFT substrate is manufactured.

Next, the method for manufacturing the opposing substrate will be explained with reference to FIGS. 9A–9D. First, in the step shown in FIG. 9A, red (R), green (G), and blue (B) color filters 21R, 21G, and 21B are formed on the substrate 20. In order to form the R color filter 21R, a photosensitive R film resist is affixed, which is then exposed and developed in the shape corresponding to the R display pixels. In the same way, the G color filter 21G and the B color filter 21B are formed, too. These color filters 21R, 21G and 21B are formed in dimensions larger than at least corresponding pixel electrode 19.

Figure 9A:
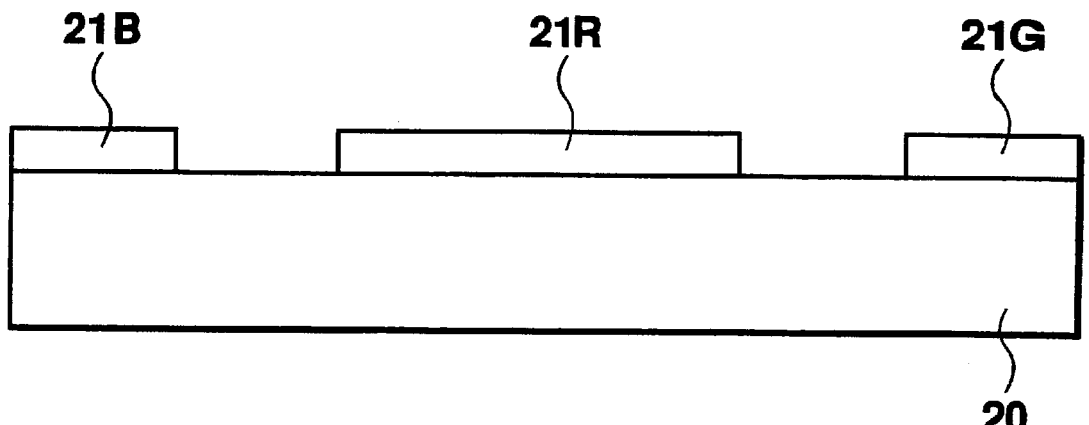
FIGS. 9A, 9B, 9C, and 9D are cross sections showing manufacturing steps of the opposing substrate of the liquid crystal display in accordance with the present invention.
Figure 9B:
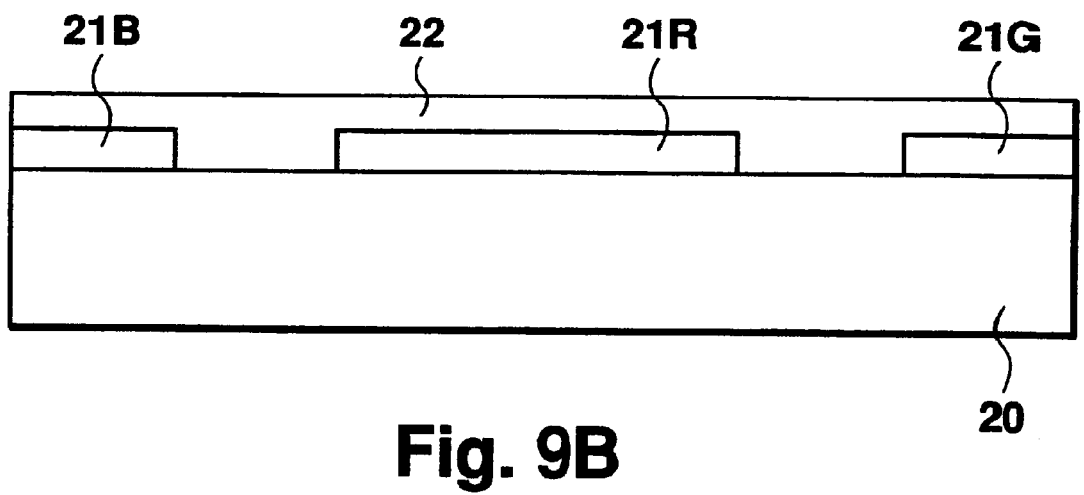

In the step shown in FIG. 9B, an acrylic resin film is formed to cover the color filters 21R, 21G, and 21B, so as to form protection film 22 of the color filters 21R, 21G, and 21B. This protection film 22 also works as a planarization film for a foundation of the common electrode 23.

Figure 9C:
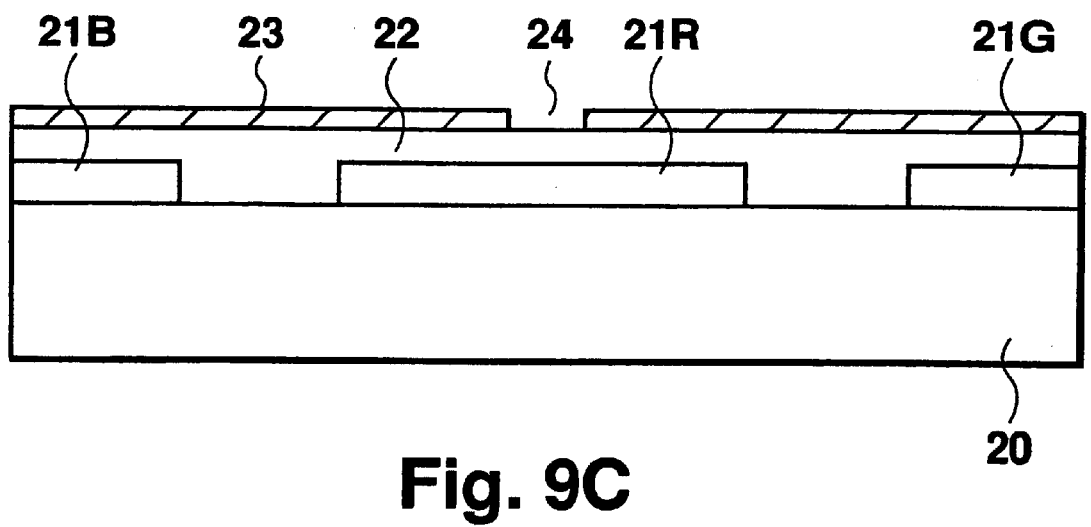

In the step shown in FIG. 9C, an ITO film is formed by sputtering, which is etched to form the common electrode 23 and the direction control window 24 in the common electrode 23.

Figure 9D:
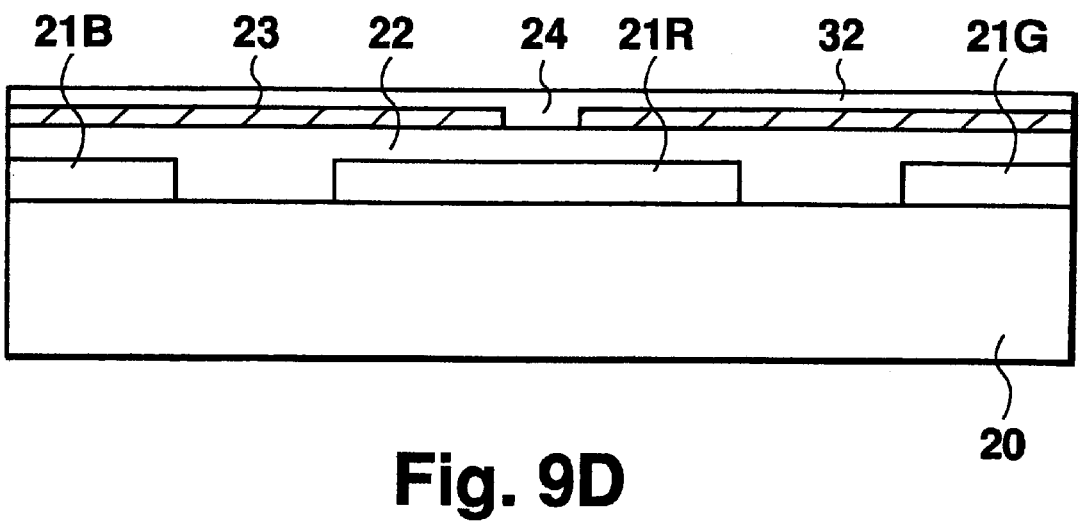

In the step shown in FIG. 9D, a liquid-like polyimide is coated by printing and is prebaked at 80° C. for 10 minutes, followed by main baking at 180° C. for 30 minutes and drying so as to form the vertical alignment film 32.

As described above, an opposing substrate is manufactured.

Figure 5:
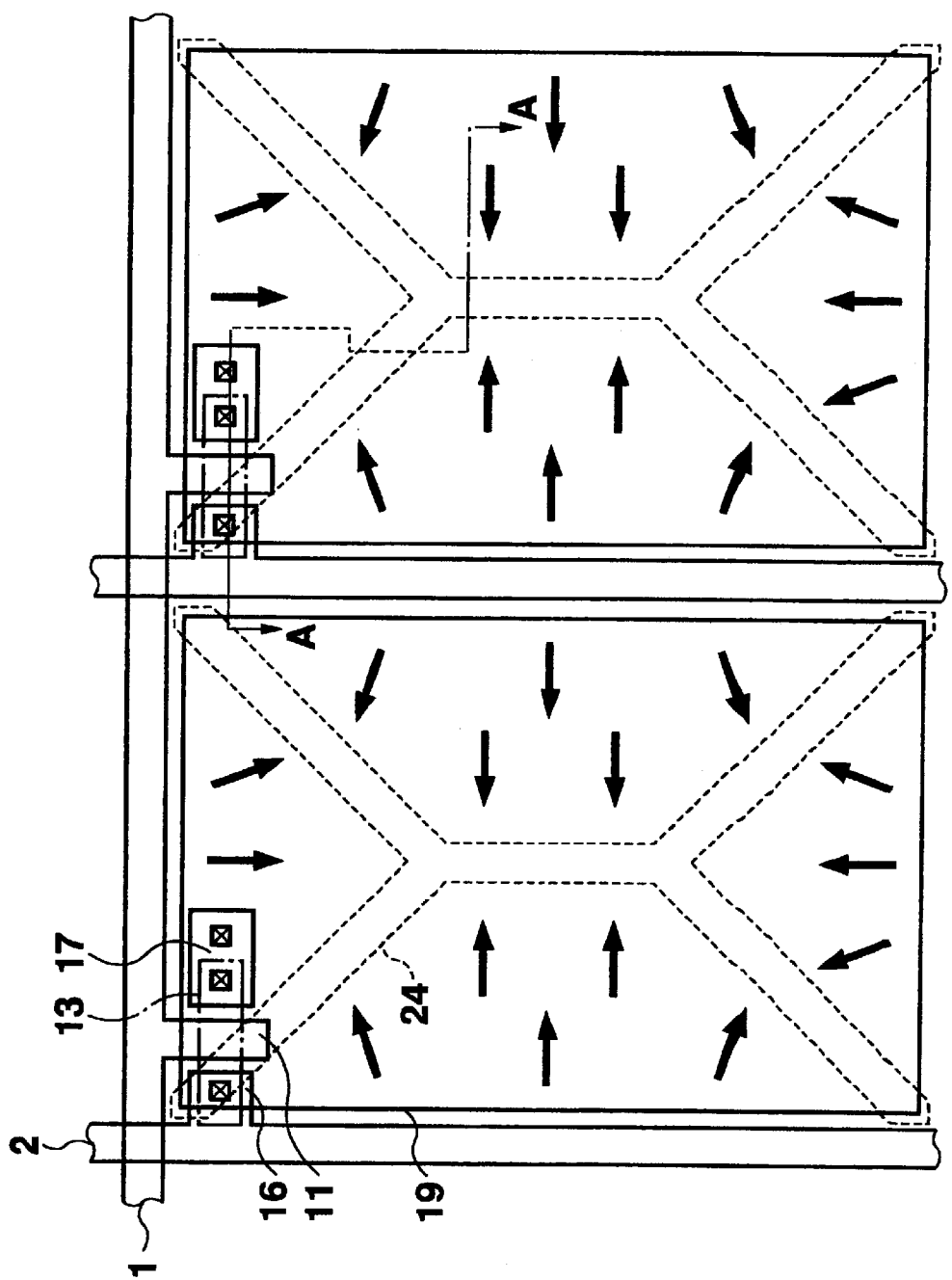
FIG. 5 is a plan view of a liquid crystal display in accordance with an embodiment of the present invention.
Figure 6:
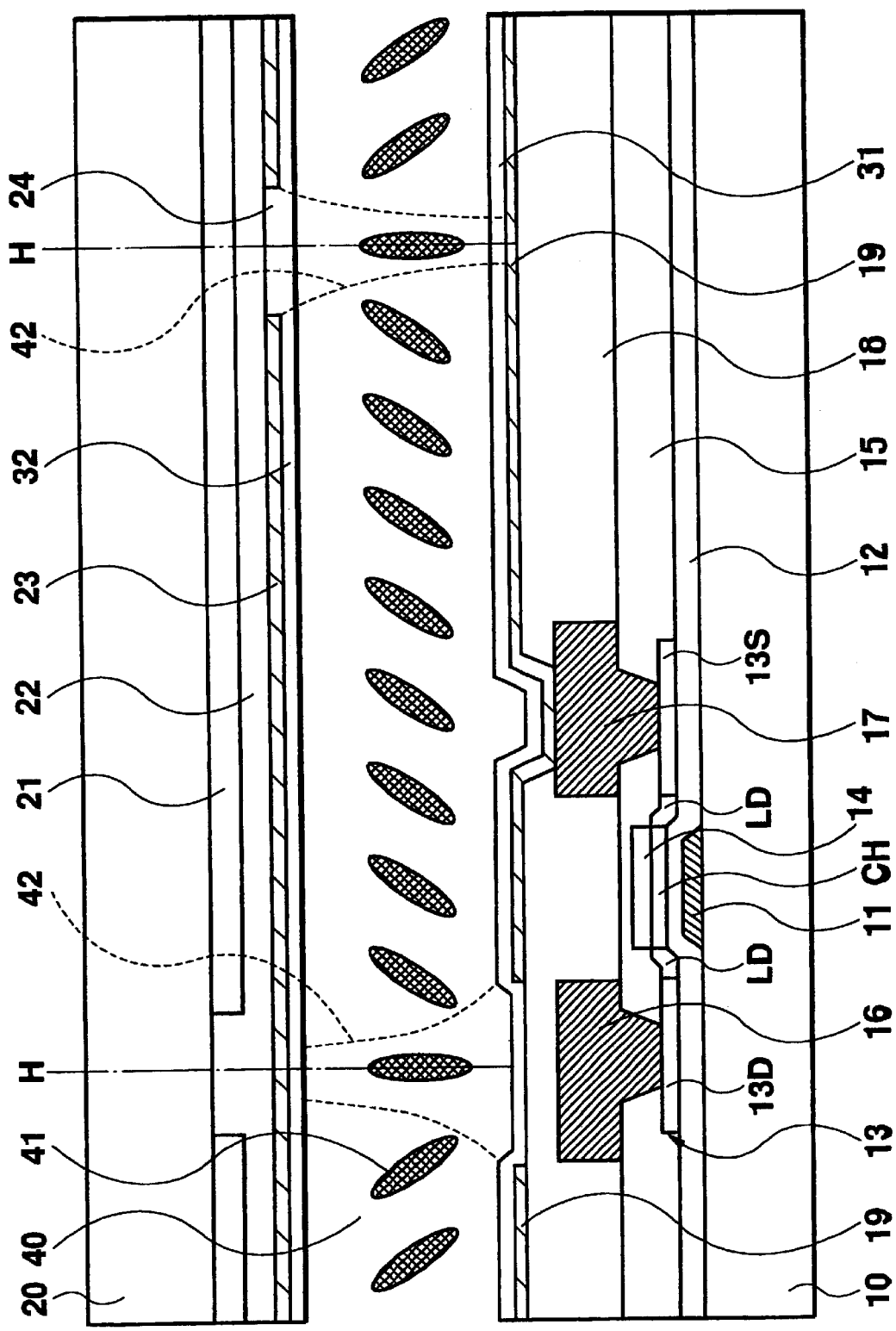
FIG. 6 is a cross section along A—A line of the liquid crystal display shown in FIG. 5.

The TFT substrate and the opposing substrate, each of which is manufactured as mentioned above, are affixed to each other with a gap of approximately 4 micrometer by a sealing member disposed at the peripheral portion of the substrates, including the liquid crystal layer 40 therebetween. FIG. 5 is a plan view of the display pixel portion of the LCD manufactured by the method in accordance with the present invention. FIG. 6 is a cross section along A—A line shown in FIG. 5. The color filters 21R, 21G and 21B are disposed at each position corresponding to each pixel electrode 19 of the TFT substrate side. In addition, the direction control window 24 extends linearly in the middle portion of the pixel and branches at each end in two directions, each of which bends by 45 degrees toward a corresponding corner of the pixel as shown in FIG. 7.

Though not illustrated, a polarizing film is affixed to each of the outer surfaces of the substrates 10 and 20.

The TFT mentioned above uses polysilicon (p-Si) instead of amorphous silicon (a-Si) that is now typically used. This p-Si TFT has a large ON-current characteristic, so that the TFT dimensions can be reduced. Thus, the aperture ratio is improved and a high resolution can be performed. In addition, the p-Si TFT has a fast operation speed, and a peripheral circuit (driver) can be integrally formed on the substrate together with the display portions, so that an LCD with a built-in driver can be manufactured.

Figure 7:
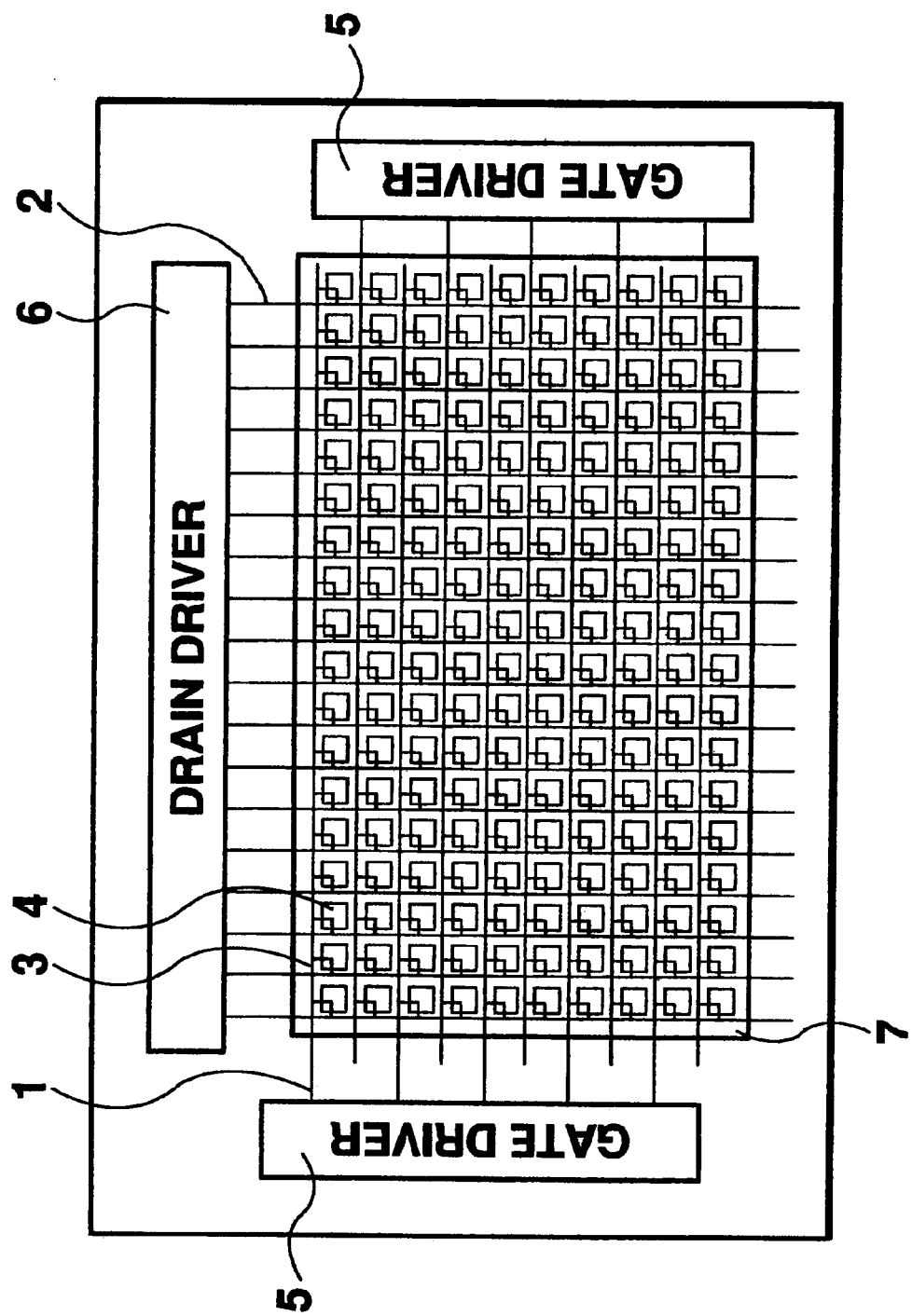
FIG. 7 illustrates a structure of the liquid crystal display in accordance with the present invention.

FIG. 7 shows an LCD with a built-in driver. In the middle portion gate lines 1 connected to gate electrodes 11 and drain lines 2 connected to the drain electrodes 16 are crossing each other; each cross section is provided with a TFT 3 and a pixel electrode 4 connected to the TFT 3 so as to form a display portion. On the periphery of the display portion, gate drivers 5 for supplying scanning signals to the gate lines 1 and a drain driver 6 for supplying pixel signals to the drain lines 2 are formed. The display portions, the gate drivers 5, and the drain drivers 6 are formed on a same substrate. In addition, another substrate facing the substrate via liquid crystal is provided with a common electrode 7. The common electrode 7 and the liquid crystal are defined by the pixel electrodes 4 so as to form display pixels. The peripheral driver portion is constructed with CMOS consisting of N-channel and P channel TFTs having the same structure as shown in FIG. 6, though P-channel TFT does not exist in the LD region.

Furthermore, since the vertical alignment films 31 and 32 are not processed by the rubbing treatment as shown in FIG. 8I and 9D. Furthermore, the pretilt angle is set within one degree, preferably at zero degree as shown in FIG. 6. In other words, the alignment vector indicating an average alignment within a minute area agrees the normal direction, or the angle therebetween is equal to or less than one degree, in the initial state. Therefore, in the voltage-applied state too, the liquid crystal molecules 41 are directed in the normal direction or within one degree from the normal direction between the display pixels.

In the above-mentioned structure, when the voltage is applied, an electric field 42 is generated between the pixel electrode 19 and the common electrode 23, so that the liquid crystal molecules tilt. At the edge portion of the pixel electrode 19, the electric field 42 is slanting from the edge of pixel electrode 19 toward the common electrode 23. Accordingly, the liquid crystal molecules 41 change their alignment so as to form the shortest slanting path from the electric field 42. In other words, not depending on the directivity given by the pretilt as in the related art, the slanting electric field tilts the alignment toward the inner side of the pixel electrode 19. As shown in FIG. 5, the alignment tilts from each of four sides of a pixel electrode 19 toward the middle of the pixel electrode 19.

Since the common electrode 23 does not exist in the direction control window 24, the electric field is not generated, even if the voltage is applied between the pixel electrode 19 and the common electrode 23. The liquid crystal molecules 41 are fixed to the initial alignment in the area of the direction control window 24. Though the alignment controlled by the four sides of the pixel electrode 19 influences the middle portion of the pixel electrode 19 because of the continuity of the liquid crystal, the boundary between the areas in which the alignment of the liquid crystal are different is fixed on the direction control window 24. In other words, as shown in FIG. 5, the alignment of the liquid crystal molecules are directed in four different directions in each area within the display pixel defined by the direction control window 24, i.e., so-called pixel division is performed. Therefore, in each display pixel, areas having different transmittances are recognized as averaged, so that a constant brightness can be obtained for all viewing angles. Thus, the problem of viewing angle dependence is solved and a wide viewing angle display can be obtained.

Especially, in the present invention, the smoothing insulator film 18 of the TFT substrate side and the smoothing insulator film 22 of the opposing substrate side function as foundations of the pixel electrode 19 and the common electrode 23 for enhancing the smoothness thereof. Thus, the above-mentioned alignment control is performed more properly. Particularly, when the liquid crystal having negative dielectric constant anisotropy changes from the vertical orientation, a good alignment change is promoted along with generation of an interaction with the electric field, i.e., an action opposing the electric field. In addition, considering unevenness of the TFT or the color filter layer 61, which may be found in a high resolution LCD, the step forming the unevenness is suppressed to enhance the evenness of the interface contacting the liquid crystal layer 80. Thus, uniformity of the orientation is improved and the display quality is improved.

Furthermore, the smoothing insulator film 18 has a thickness of approximately one micrometer so that the liquid crystal will not be easily influenced by the electric field of the TFT and electrode wires 1, 2, 16, and 17 disposed under the smoothing insulator film 18. Therefore, as described above, pixel division can performed in the excellent condition by the combination action of the slanting electric field 42 at the edge portions of the pixel electrode 19 and no electric field at the direction control window 24.

If the width of the direction control window 24 is increased sufficiently, a slanting electric field 42 is generated at the edge portion of the direction control window 24, too, as shown in FIG. 6. In this case, if the direction control window 24 has a shape as shown in FIG. 5, the tilt direction of the liquid crystal molecule 41 at the edge portion of the pixel electrode 19 and the tilt direction of the liquid crystal molecule 41 at the edge portion of the direction control window 24 are identical, or at most differ within 45 degrees, in any area defined by a side of the pixel electrode 19 and the direction control window 24. Accordingly, the alignment control action at the edge portion of the pixel electrode 19 is substantially the same as that at the edge portion of the direction control window 24, and control performance can therefore be improved. In other words, in each minute area of the display pixel defined by the direction control window 24 the orientation is controlled by the edge portion of the pixel electrode 19 as well as by the edge portion of the direction control window 24 similarly, so that the orientation is aligned with high uniformity.

Figure 1:
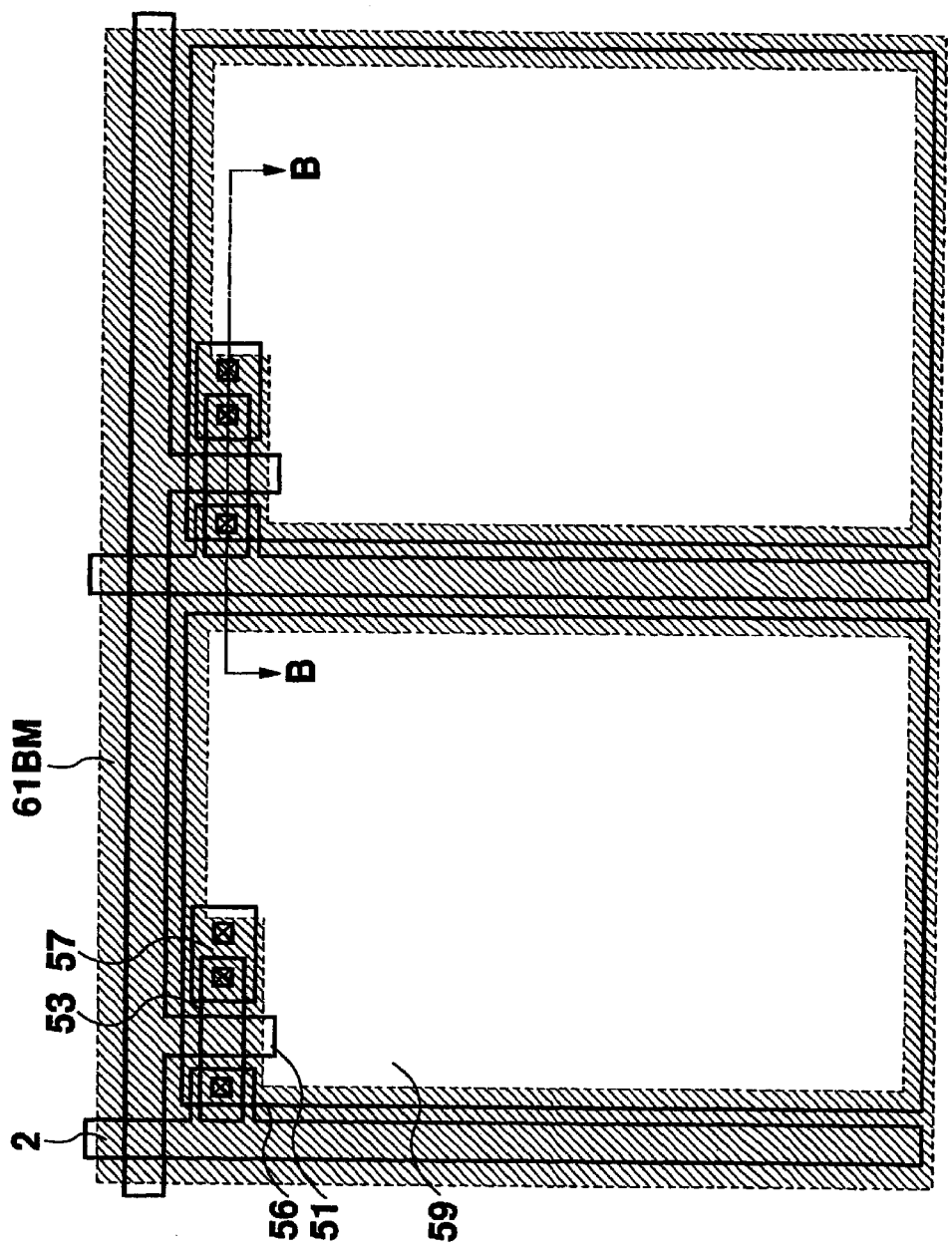
FIG. 1 is a plan view of a liquid crystal display in accordance with the related art.
Figure 2:
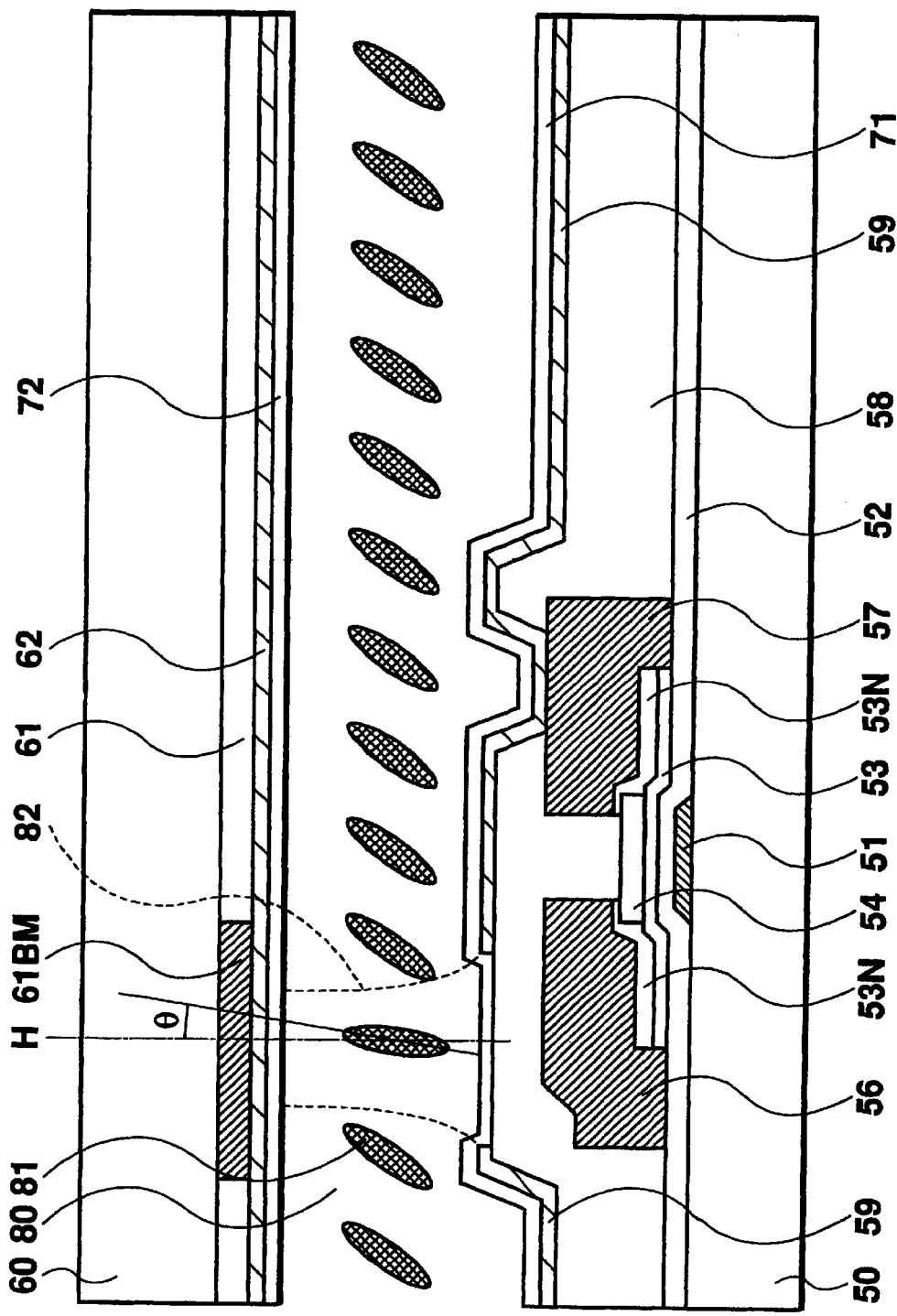
FIG. 2 is a cross section along B—B line of the liquid crystal display shown in FIG. 1.
Figure 3:
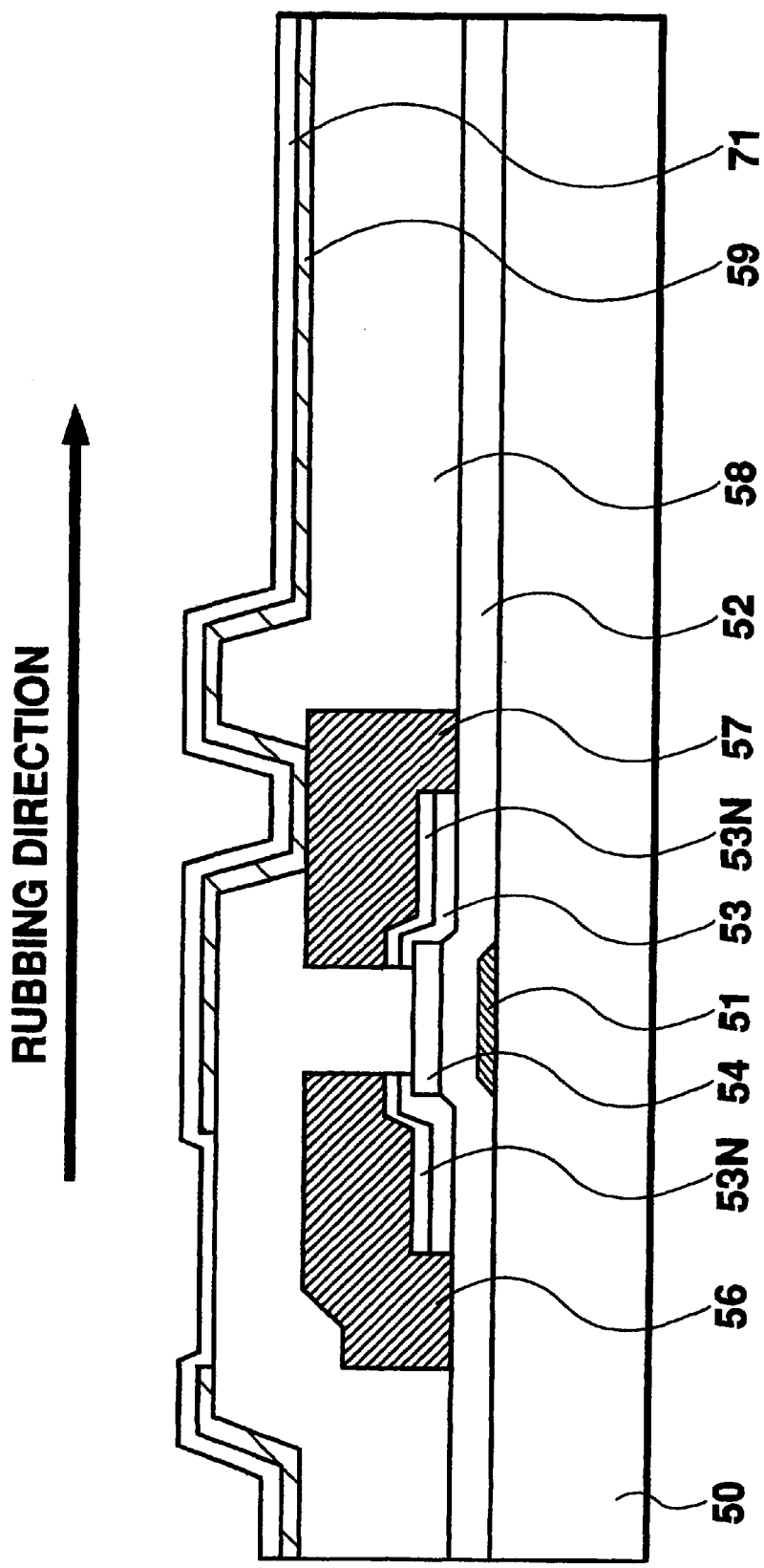
FIG. 3 is a cross section showing a manufacturing step of the liquid crystal display in accordance with the related art.
Figure 4A:
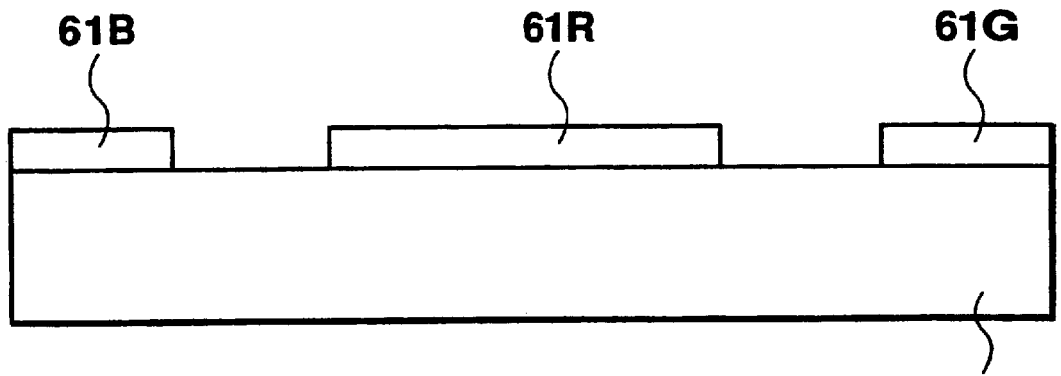
FIGS. 4A, 4B, 4C, 4D, and 4E are cross sections showing manufacturing steps of the opposing substrate of the liquid crystal display in accordance with the related art.
Figure 4B:
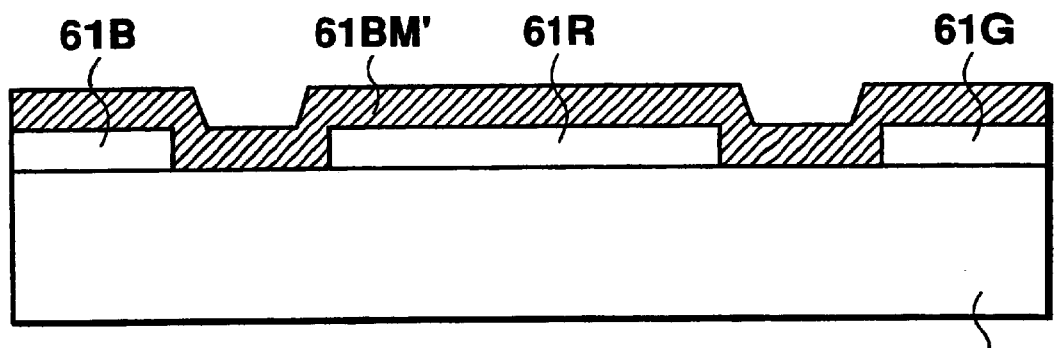
Figure 4C:
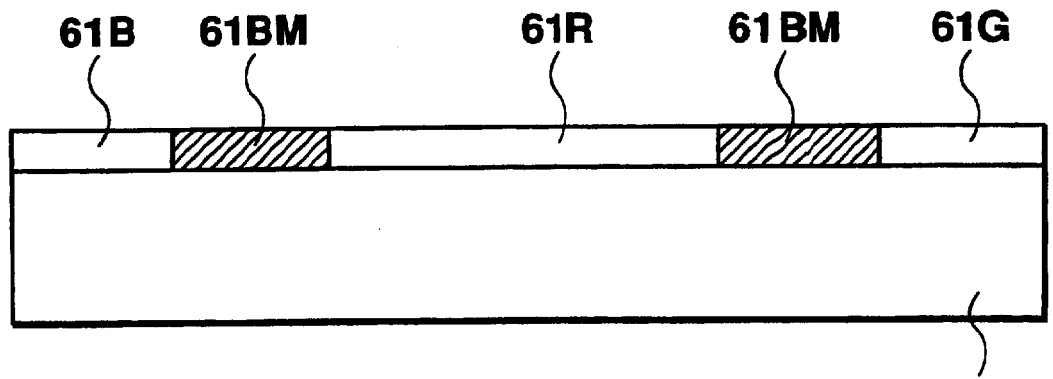
Figure 4D:
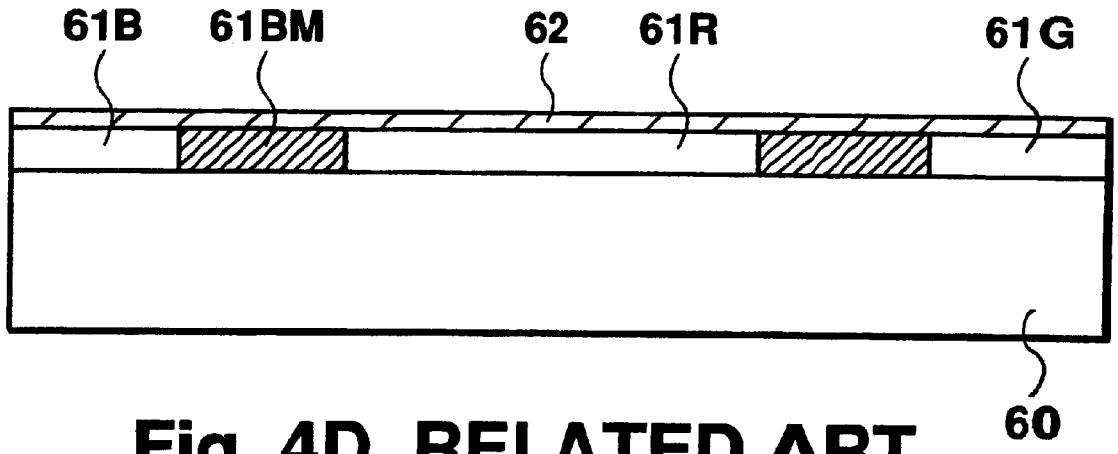
Figure 4E:
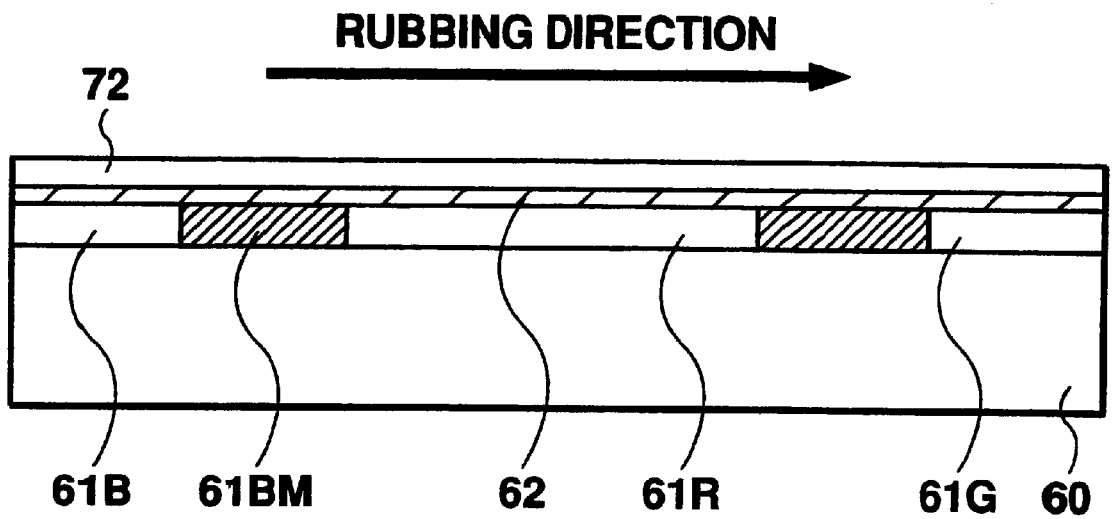

On the other hand, the opposing substrate 20 does not have the black matrix 61BM shown in FIGS. 1 and 2 because the initial alignment of the liquid crystal molecule 41 is within one degree from the normal direction in the present invention, so that light leak in the area between the pixel electrodes 19 due to the pretilt given to the liquid crystal is suppressed, and the light is completely blocked without the black matrix. Therefore, it is not necessary to make the light shielding film on the opposing substrate 20 side larger in consideration of possible position shift during affixing. The effective display area is therefore prevented from decreasing, i.e., the aperture ratio is prevented from decreasing.

In the present invention, the rubbing treatment is not performed in the step for forming the vertical alignment film 31 of the TFT substrate 10 as shown in FIG. 8I. In the LCD with built-in drivers, many more TFTs are concentrated in the driver portions 5, 6 as compared with the display portions. If only one of the TFTS breaks down, a defective display occurs. However, since the rubbing treatment is not performed in the present invention, such problem does not occur and yield in production is improved.

What is claimed is:

1. A method for manufacturing a liquid crystal display that has first and second substrates facing each other, the outer surface of the first and/or second substrate being provided with a polarizing film, and the liquid crystal disposed between the first and second substrates for modulating light that passed through the polarizing film so as to perform display, the method comprising the steps of:

forming a plurality of thin film translators and electrode wires thereof on the surface of the first substrate facing the second substrate;

forming an insulating film having a planarization surface for covering the thin film translators and the electrode wires thereof;

forming an opening in the insulating film so as to expose a part of the corresponding thin film transistor;

forming a pixel electrode for driving the liquid crystal on the insulating film and connecting the pixel electrode to the thin film transistor via the opening;

forming a first film to be a vertical alignment film covering the pixel electrodes, for controlling an initial direction of the liquid crystal;

heating the first film by a first-temperature pre-baking and a second-temperature main baking followed by drying the first film to make the vertical alignment film that controls the initial direction of the liquid crystal in the direction within one degree from the normal direction of the substrates;

forming a common electrode for driving the liquid crystal on the surface of the second substrate facing the first substrate, and forming a direction control window that is no electrode portion having a predetermined shape in the area of the common electrode facing the pixel electrode;

forming a second film to be a vertical alignment film covering the common electrode, for controlling an initial direction of the liquid crystal;

heating the second film by a first-temperature pre-baking and a second-temperature main baking followed by drying the second film to make the vertical alignment film that controls the initial direction of the liquid crystal in the direction within one degree from the normal direction of the substrates;

affixing the first substrate to the second substrate with a predetermined gap;

injecting the liquid crystal having negative dielectric constant anisotropy into the gap between the first and second substrates, followed by sealing the gap; and affixing a polarizing film onto the outer surface of the first and/or second substrate.

2. A method for manufacturing a liquid crystal display that has first and second substrates facing each other, the outer surface of the first and/or second substrate being provided with a polarizing film, and the liquid crystal disposed between the first and second substrates for modulating light that passed through the polarizing film so as to perform display, the method comprising the steps of:

forming a gate electrode of a thin film transistor and a wire thereof on the surface of the first substrate facing the second substrate;

forming a gate insulating film that covers the gate electrode;

forming an amorphous semiconductor layer on the gate insulating film;

performing laser annealing on the amorphous semiconductor layer to create polycrystal for forming a polycrystal semiconductor layer;

doping an impurity into a predetermined region of the polycrystal semiconductor layer at a predetermined concentration;

patterning the polycrystal semiconductor layer into areas necessary for the thin film transistor;

forming a first interlayer insulating film on the polycrystal semiconductor layer, and removing a portion above the region that was doped with the impurity so as to form a first opening;

forming a drain and/or source electrode and a wire thereof on the first interlayer insulating film, and connecting the drain and/or source electrode to the regions doped with impurity, respectively, via the first opening;

forming a second interlayer insulating film covering the thin film transistor and having a planarization surface, and removing a predetermined portion above the thin film transistor so as to form a second opening;

forming a pixel electrode for driving the liquid crystal, and connecting the pixel electrode to the thin film transistor via the second opening;

forming a first film to be a vertical alignment film covering the pixel electrodes, for controlling an initial direction of the liquid crystal;

heating the first film by a first-temperature pre-baking and a second-temperature main baking followed by drying the first film to make a vertical alignment film for controlling an initial direction of the liquid crystal in the direction within one degree from the normal direction of the substrates;

forming a common electrode for driving the liquid crystal on the surface of the second substrate facing the first substrate, and forming a direction control window where no electrode is disposed having a predetermined shape in the area of the common electrode facing the pixel electrode;

forming a second film to be a vertical alignment film covering the common electrode, for controlling an initial direction of the liquid crystal;

heating the second film by a first-temperature pre-baking and a second-temperature main baking followed by drying the second film to make a vertical alignment film for controlling an initial direction of the liquid crystal in the direction within one degree from the normal direction of the substrates;

affixing the first substrate to the second substrate with a predetermined gap;

injecting the liquid crystal into the gap between the first and second substrates, followed by sealing the gap; and affixing a polarizing film onto the outer surface of the first and/or second substrate.

3. The method for manufacturing a liquid crystal display in accordance with claim 1, further comprising the step of forming a color filter layer on the surface of the second substrate facing the first substrate for coloring the modulated light, wherein the common electrode and the directin control window are formed on the color filter layer.

4. The method for manufacturing a liquid crystal display in accordance with claim 3, further comprising the step of forming a protection film of the color filter on the color filter layer, wherein the common electrode and the direction control window are formed on the protection film.

5. The method for manufacturing a liquid crystal display in accordance with claim 1, wherein the vertical alignment film is not processed by rubbing treatment.

6. The method for manufacturing a liquid crystal display in accordance with claim 1, wherein the insulating film has thickness more than one micrometer.

7. A method for manufacturing a vertical alignment type liquid crystal display, comprising the steps of:

forming a first film to be a vertical alignment film on a first surface of a substrate contacting a liquid crystal layer on the substrate, for controlling an initial direction of the liquid crystal;

heating the first film by a first-temperature pre-baking and a second-temperature main baking followed by drying the first film to make the vertical alignment film that controls the initial direction of the liquid crystal substantially in the normal direction of the substrates;

affixing the first substrate having the vertical alignment film without rubbing treatment to a second substrate with a predetermined gap; and injecting the liquid crystal into the gap between the substrates, followed by sealing the gap.

8. The method for manufacturing a liquid crystal display in accordance with claim 7, further comprising the step of forming a vertical alignment film on a surface of the second substrate, for controlling an initial direction of the liquid crystal substantially in the normal direction of the substrates, wherein the second substrate that is affixed in the affixing step has the vertical alignment film without rubbing treatment.

9. The method for manufacturing a liquid crystal display in accordance with claim 8, wherein the vertical alignment film controls the initial direction of the liquid crystal in the direction within one degree from the normal direction of the substrates.

* * * * *